United States Patent Office 3,370,967
Patented Feb. 27, 1968

3,370,967
REFRACTORY GRAPHITE AND METHOD OF PRODUCING THE SAME
Robert T. Ellis, Kenmore, and Leslie H. Juel, Lewiston, N.Y., assignors to Great Lakes Carbon Corporation, New York, N.Y., a corporation of Delaware
No Drawing. Filed Oct. 5, 1964, Ser. No. 401,649
9 Claims. (Cl. 106—56)

This invention relates to refractory and oxidation-resistant graphite articles. The invention is particularly applicable to graphite electrodes which are used to conduct current in electric furnaces, but also pertains to massive graphite mold stock for the pouring or casting of molten metals and other hot molten compositions, etc. The invention also pertains to graphite articles or bodies of a fibrous nature or having a fibrous structure such as yarn, tape, felt, filaments and cloth, etc. which have been baked and graphitized.

The invention particularly relates to such graphite electrodes or bodies which have been treated with a substance (to be described hereinafter) which materially reduces the oxidation which ordinarily takes place during the use of such electrodes or bodies.

It is well known that graphite electrodes used in furnace work are comparatively short lived, due to the fact that they oxidize readily at the high temperatures which obtain within the furnace. The electrodes rapidly lose weight and they become tapered or pointed, thus losing perhaps 50–75% of the original electrodes cross-sectional area before beginning to support the arc—their primary function. The loss of graphite at points remote from the arc is also objectionable from the standpoint of reduction in strength of the electrode.

Oxidation losses also occur in such cases as in the casting of fused alumina, where the molten or hot composition itself exerts an oxidizing effect upon the graphite. Also, the erosion effect of molten metals upon graphite is quite pronounced, particularly in an oxidizing atmosphere.

Various attempts have been made to improve the properties of graphite to render it more resistant to oxidation. For example, it has been the practice to reduce the porosity of a graphite body by employing an impregnation operation at some point during its manufacture with a carbonaceous material such as tar or pitch from coal or petroleum sources, or with certain natural or synthetic resinous compositions. Such techniques have provided only a partial solution to the problem. In addition, they are more expensive because of the extra processing involved.

It has also been proposed to impregnate graphite with phosphoric acid. While this reduces the oxidation of graphite at low temperatures, it has been found that such treatment actually catalyzes oxidation at temperatures in excess of 600° C. A further disadvantage of the use of this impregnant is the corrosive nature of the phosphoric acid.

It is an object of this invention to provide novel materials of construction based upon graphite.

It is a further object of the invention to provide massive graphite bodies having improved resistance to oxidation, or articles having improved resistance to erosion by molten metals or improved resistance to hot chemicals which normally oxidize graphite.

The above objects as well as others which will become apparent upon understanding of the invention as herein described are achieved by impregnating or depositing in the pores of a previously formed massive graphite body a composition comprised essentially of an inorganic ammonium boron compound having the empirical formula $$x(NH_4)_2O \cdot y(B_2O_3) \cdot zH_2O$$

wherein $x$ is an integer or possesses a value from 1 to 3, $y$ is an integer or possesses a value from 1 to 6, and $z$ is an integer or possesses a value from 0 to 10. A preferred material embraced within the foregoing class of compounds is ammonium pentaborate octahydrate having the formula $(NH_4)_2O \cdot 5B_2O_3 \cdot 8H_2O$; or, expressed in an alternative manner, the formula $(NH_4)_2B_{10}O_{16} \cdot 8H_2O$.

It should be understood at the outset that our invention contemplates a treatment by various techniques of previously formed, massive graphite bodies so as to deposit the inorganic ammonium boron compound within the internal and/or surface pores of the base material as distinguished from adding the compound to a "green" carbon mix followed by baking and graphitizing. Such bodies include fibrous materials such as previously referred to.

Typical graphite bodies which are treated according to our novel process are described, as to their methods of manufacture and properties, in Mantell, Industrial Carbon, Second Edition, 1946, particularly in chapters XIII–XVI. Pages 207–216 in chapter XIII are particularly pertinent. However, the methods of manufacturing these graphite bodies form no part of this invention. Ordinarily, the graphitized bodies which may be treated according to our novel process will have an apparent density (grams/cm.³) in excess of 1.5 and preferably 1.6 to 1.8. The higher densities of the graphitized bodies are normally achieved by pitch impregnating gas-baked carbon bodies, followed by graphitization.

The treatment of the graphite body with the inorganic ammonium boron compound may be accomplished by various techniques according to our invention. Eminently satisfactory results and prolonged service-life of the final material are achieved by impregnation. This may be accomplished by placing the graphite body in a container which is subsequently evacuated to about 25–30 inches' mercury. After several minutes a solution or suspension of the inorganic ammonium boron compound is admitted after which the vessel is pressurized to effect partial or total impregnation of the pores. Alternatively, and where complete penetration or impregnation is not essential or necessary, the base graphite body can be coated with the compound (as by brushing or spraying), or soaked with solutions or suspensions of same so as to deposit the inorganic ammonium boron compound in the surface and/or sub-surface pores of the graphite body. "Depositing in the surface pores" is also meant to connote the application of or flow of the inorganic ammonium boron compound in the interstices between various filaments of graphite fibrous materials or between yarns of graphite cloth, etc. Alternatively, a combination of the foregoing methods can be employed, but it should be noted that none of these treatments are integral with the process of producing the graphite body itself, but are carried out subsequent to its formation.

In a specific embodiment of the invention, an aqueous solution containing 20% by weight of the $$(NH_4)_2B_{10}O_{16} \cdot 8H_2O$$

and a small amount (for example, 0.1%) of wetting agent is admitted to a previously evacuated vessel containing pieces of massive graphite having an apparent density of about 1.7 g./cc. The system is then pressurized at about 100 lbs. per square inch for 15 minutes. After removal from the solution and draining off the excess solution, the graphite can be used directly in several applications; however in some cases, or for some purposes, it is preferable to dry the resulting graphite pieces, such as by heating them at 110° C. for several hours and then heating to constant weight at a temperature of 250° C. The resulting article forms an excellent mold or casting stock in the pouring of fused alumina, glass, pig iron and other molten metals.

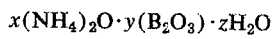

Graphite articles treated in the foregoing or in a similar manner with, for example $(NH_4)_2B_{10}O_{16} \cdot 8H_2O$, so as to secure a pickup of from 0.4 to 2.4 weight percent of the salt possessed considerably improved resistance to oxidation as compared to corresponding untreated articles or "controls." The following tables illustrate these improvements, as well as other aspects of the invention such as processing techniques, etc.

A number of graphite samples, in the form of cubes about one inch on a side, were cut from a standard 20 inch diameter graphite electrode and then soaked in an aqueous solution of Ammonium Pentaborate Octahydrate (APB). The solution contained 20% APB by weight, plus 0.1% Fisher Scientific Co. Aerosol, as a wetting agent. The solution temperature was held constant at 52° C. The initial temperature of the graphite sample was varied as was the soaking time. A 10 minute soak of a sample initially at room temperature resulted in a pickup of 0.4% by weight of APB. Pickups of 1.2 and 2.4% were obtained by soaking samples initially at 52° C. for 10 and 30 minutes respectively. The samples, so treated, having pickups of 0.4, 1.2 and 2.4%, together with a number of untreated or "control" samples, were subjected to an oxidation test by placing in a muffle furnace maintained at 700° C. Oxygen was admitted to the furnace at a rate of about 0.5 liters per minute per sample and at various intervals of time the samples were removed from the furnace, cooled and weighed. Each sample was oxidized with its control immediately adjacent.

The results obtained are expressed in Table I in terms of percent weight loss for the treated graphite as compared to the corresponding percent weight loss for the untreated graphite.

TABLE I.—PERCENT WEIGHT LOSS OF GRAPHITE SAMPLES AT 700° C. IN OXYGEN

| Percent Pickup of APB | Percent Weight Loss | | | | | |
|---|---|---|---|---|---|---|
| 0.0 | 15 | 20 | 30 | 40 | 50 | 60 |
| 0.4 | 10 | 14 | 16 | 17 | 19 | 20 |
| 1.2 | 10 | 13 | 16 | 19 | 20 | 21 |
| 2.4 | 7 | 10 | 13 | 15 | 16 | 17 |

It was also found that graphite articles treated in the foregoing manner (e.g., with $(NH_4)_2B_{10}O_{16} \cdot 8H_2O$ to effect a weight pickup of about 0.4 to about 2.4%) continue to offer improved oxidation resistance up to at least 1400° C., as illustrated in Table II.

TABLE II

| Temperature of Oxidation | APB Content, Percent | Time, in Minutes, to 20% Weight Loss |
|---|---|---|
| 700° C | 0 | 360 |
| | 2 | 700 |
| 1,000° C | 0 | 37 |
| | 2 | 70 |
| 1,400° C | 0 | 15 |
| | 2 | 26 |

The foregoing tables show the effectiveness of varying amounts of $(NH_4)_2B_{10}O_{16} \cdot 8H_2O$ in reducing the oxidation of graphite bodies. As previously stated, the inorganic ammonium boron compounds which are effective in the present invention include not only this compound but other compounds designated by the empirical formula:

$$x(NH_4)_2O \cdot y(B_2O_3) \cdot zH_2O$$

wherein $x$ is an integer from 1 to 3, $y$ is an integer from 1 to 6, and $z$ is an integer from 0 to 10.

Included among the compounds embraced within the empirical formula are the following compounds:

$(NH_4)_2O \cdot 5B_2O_3 \cdot 8H_2O$; $2(NH_4)_2O \cdot B_2O_3 \cdot 2H_2O$
$3(NH_4)_2O \cdot 4B_2O_3 \cdot 3H_2O$; $3(NH_4)_2O \cdot 4B_2O_3 \cdot 9H_2O$
$(NH_4)_2O \cdot 2B_2O_3 \cdot 4H_2O$; $(NH_4)_2O \cdot 2B_2O_3 \cdot 5H_2O$
$2(NH_4)_2O \cdot 5B_2O_3 \cdot 5H_2O$; $(NH_4)_2O \cdot 3B_2O_3 \cdot 7H_2O$
$(NH_4)_2O \cdot 4B_2O_3 \cdot 6H_2O$; $(NH_4)_2O \cdot 4B_2O_3 \cdot 4H_2O$
$(NH_4)_2O \cdot 6B_2O_3 \cdot 9H_2O$; and $2(NH_4)_2O \cdot B_2O_3 \cdot H_2O$.

The solubility of the inorganic ammonium boron compound in solvents such as water will vary depending upon a number of factors such as the particular compound or solvent used, and their particular solubility relationship, and temperatures, etc. Preferred treating (such as impregnation) results are generally obtained by using a heated solvent (when dissolving, or suspending, the inorganic ammonium boron compound) and also by using heated graphite articles when treating same. However, the solvents (or solutions) or graphite articles will rarely be above 100° C. when the dissolving or treating steps are carried out. Temperatures as low as or lower than 5° C. for either of these steps will seldom be employed or encountered, although temperatures in this region are sometimes operative for effecting small percentage pickups of the inorganic ammonium boron compound in the graphite article.

Solution or suspension concentrations of from 5% to 50%, by weight, of the inorganic ammonium boron compound are typically employed in this invention, depending upon the particular compound and/or solvent used, and temperatures employed, etc.; the higher concentrations generally being obtained at the higher solvent temperatures just discussed. These concentrations generally result in percentage-pick-ups of from about 0.1% to about 5% by weight of the inorganic ammonium boron compound in the graphite article, although this will also be affected by such factors as the porosity of the graphite article, the temperatures obtaining during the treatment, the treatment time employed, etc.

Pick-up percentages may also be increased by employing auxiliary aids such as wetting agents, or by employing multiple impregnations or "treatments"; and such procedures are within the scope of the invention. The use of mixtures of inorganic ammonium boron compounds or of mixed solutions, etc., of different inorganic ammonium boron compounds are also within the scope of the invention.

It is to be understood that the invention is not limited to the specific examples which have been offered merely as illustrative and that modifications may be made within the scope of the appended claims without departing from the spirit of the invention.

We claim:

1. A graphite article of improved resistance to oxidation having deposited at least in the surface pores of a previously formed, massive, graphite article at least about 0.1% by weight of an inorganic ammonium boron compound having the empirical formula $$x(NH_4)_2O \cdot y(B_2O_3) \cdot zH_2O$$

wherein $x$ is an integer from 1 to 3, $y$ is an integer from 1 to 6, and $z$ is an integer from 0 to 10.

2. A graphite article of improved resistance to oxidation having deposited at least in the surface pores of a previously formed, massive, graphite article at least about 0.1% by weight of an inorganic ammonium boron compound selected from the group consisting of:

$(NH_4)_2O \cdot 5B_2O_3 \cdot 8H_2O$; $2(NH_4)_2O \cdot B_2O_3 \cdot 2H_2O$
$3(NH_4)_2O \cdot 4B_2O_3 \cdot 3H_2O$; $3(NH_4)_2O \cdot 4B_2O_3 \cdot 9H_2O$
$(NH_4)_2O \cdot 2B_2O_3 \cdot 4H_2O$; $(NH)_4)_2O \cdot 2B_2O_3 \cdot 5H_2O$
$2(NH_4)_2O \cdot 5B_2O_3 \cdot 5H_2O$; $(NH_4)_2O \cdot 3B_2O_3 \cdot 7H_2O$
$(NH_4)_2O \cdot 4B_2O_3 \cdot 6H_2O$; $(NH_4)_2O \cdot 4B_2O_3 \cdot 4H_2O$
$(NH_4)_2O \cdot 6B_2O_3 \cdot 9H_2O$; and $2(NH_4)_2 \cdot O \cdot B_2O_3 \cdot H_2O$ 3. A graphite article of improved resistance to oxidation having deposited at least in the surface pores of a previously formed, massive, graphite article at least about 0.1% by weight of the inorganic ammonium boron compound $(NH_4)_2O \cdot 5B_2O_3 \cdot 8H_2O$.

4. A graphite article according to claim 1 wherein said article has an apparent density between about 1.5 and about 1.8 g./cc. prior to adding the inorganic ammonium boron compound thereto.

5. A method for producing a refractory article of improved resistance to oxidation which comprises depositing at least in the surface pores of a previously formed, massive, graphite article at least about 0.1% by weight of an inorganic ammonium boron compound having the empirical formula $$x(NH_4)_2O \cdot y(B_2O_3) \cdot zH_2O$$

wherein $x$ is an integer from 1 to 3, $y$ is an integer from 1 to 6, and $z$ is an integer from 0 to 10.

6. A method for producing a refractory article of improved resistance to oxidation which comprises depositing at least in the surface pores of a previously formed, massive, graphite article at least about 0.1% by weight of the inorganic boron compound $(NH_4)_2O \cdot 5B_2O_3 \cdot 8H_2O$.

7. A method according to claim 6 wherein the graphite article has an apparent density between about 1.5 and about 1.8 g./cc. prior to adding the $$(NH_4)_2O \cdot 5B_2O_3 \cdot 8H_2O$$

thereto, and wherein the $(NH_4)_2O \cdot 5B_2O_3 \cdot 8H_2O$ is in a water solution.

8. A method according to claim 7 wherein the water solution also contains a wetting agent.

9. A method according to claim 7 wherein the solution employed is at a temperature between about 5° C. and about 100° C.; and wherein the graphite article is at a temperature between about 5° C. and about 100° C.

References Cited

UNITED STATES PATENTS

| 1,566,409 | 12/1925 | Lavene | 106—56 |
| 2,949,430 | 8/1960 | Jorgensen | 106—56 |
| 2,987,488 | 6/1961 | Clark | 106—56 |

TOBIAS E. LEVOW, *Primary Examiner.*

HELEN M. McCARTHY, *Examiner.*

J. E. POER, *Assistant Examiner.*